United States Patent

Jackson et al.

[11] 4,028,785
[45] June 14, 1977

[54] TUBULAR PRODUCTS

[75] Inventors: Kenneth Thomas Jackson, Leeds; Lance Porter, Walton, near Wakefield, both of England

[73] Assignee: Yorkshire Imperial Metals Limited, Leeds, England

[22] Filed: May 30, 1974

[21] Appl. No.: 474,857

[30] Foreign Application Priority Data

June 6, 1973 United Kingdom ............ 26988/73

[52] U.S. Cl. ........................... 29/157.3 R; 138/142; 138/143; 29/DIG. 12; 29/DIG. 45; 29/DIG. 47; 29/458; 228/132; 228/133

[51] Int. Cl.² ..................................... B23P 15/26

[58] Field of Search ........ 29/157.3 R, 474.4, 474.5, 29/458, DIG. 12, DIG. 45, DIG. 47; 138/142, 143

[56] References Cited

UNITED STATES PATENTS

| | | | |
|---|---|---|---|
| 2,508,465 | 5/1950 | Offinger et al. | 138/142 |
| 2,508,466 | 5/1950 | Brace et al. | 29/474.4 X |
| 2,900,715 | 8/1959 | Milnes | 29/DIG. 45 |
| 3,025,596 | 3/1962 | Ward et al. | 29/474.5 X |
| 3,123,133 | 3/1964 | Pels et al. | 29/458 UX |
| 3,511,283 | 5/1970 | Iannone | 138/143 |

FOREIGN PATENTS OR APPLICATIONS

| | | | |
|---|---|---|---|
| 1,225,783 | 2/1960 | France | |
| 374,397 | 6/1932 | United Kingdom | 29/DIG. 47 |
| 812,819 | 4/1959 | United Kingdom | 29/DIG. 47 |

*Primary Examiner*—C.W. Lanham
*Assistant Examiner*—V. Rising
*Attorney, Agent, or Firm*—Cushman, Darby & Cushman

[57] ABSTRACT

A bimetallic tube comprising a copper-base alloy and a reactive metal such as titanium, is produced by assembling concentrically a tubular member of each of such materials and interposing a layer of copper, nickel or silver between them, forming a bond between the reactive metal and the copper, nickel or silver and extruding the assembly. The bimetallic tube is useful for heat exchange purposes when corrosive fluids are involved and has better heat transfer properties than an all-reactive metal tube.

15 Claims, 3 Drawing Figures

TUBULAR PRODUCTS

BACKGROUND OF THE INVENTION

This invention relates to a process for the forming of metal elongated products, such as tube, which consist of two or more metals or alloys, one or more of which is a reactive metal such as titanium, zirconium, or tantalum.

The choice of material for tubular products used in corrosive environments, such as in power station condensers cooled by sea water, has been essentially between those materials which have corrosion resistance and those with high thermal conductivity. In the former case metals such as titanium can be used while in the latter case alloys such as aluminum brass are used.

SUMMARY OF THE INVENTION

According to the present invention there is provided a tubular product comprising a tube of a highly thermally conductive metal having inner and/or outer surfaces of a highly corrosion resistant reactive metal.

Such a product may be a composite comprising a tubular member of a highly thermally conductive metal, an inner and/or an outer tubular member of a highly corrosion resistant reactive metal, a layer of ductile metal joining and forming a continuous interface between the inner and/or outer tubular member and the tubular member of highly thermally conductive metal.

The highly thermally conductive metal may be copper or a copper-base alloy, such as a 2% aluminum brass and the highly corrosion resistant reactive metal may be titanium or a titanium-base alloy. Zirconium and tantalum are other metals which fall into this class of materals. The ductile metal may be copper, nickel or silver.

The product may thus be in the form of a bimetallic tube with the corrosion resistant surface being either the internal or the external surface or with the corrosion resistant metal forming both the internal and external surfaces.

A method of producing a tubular elongated product in accordance with the invention comprises assembling concentrically a tubular member of a highly corrosion resistant reactive metal and a tubular member of a highly thermally conductive metal with a relatively narrow annular gap therebetween separating adjacent surfaces, interposing between the adjacent surfaces a layer or coating of copper, silver or nickel, coating the outer surface of the reactive metal tubular member with copper, silver or nickel, heating the assembly to a temperature at which a diffusion bond is formed between the reactive metal, and the copper, silver or nickel, and extruding and cold working the assembly to form the elongated product.

The copper, silver or nickel can be removed from the outer surface of the reactive metal by conventional processes such as pickling.

The narrow annular gap between the adjacent surfaces should be so dimensioned that ingress of furnace gases is kept to a minimum during preheating prior to extrusion. Preferably, the gap is up to 0.010 inch, for example, between 0.003 and 0.010 inch.

Whilst the copper, nickel or silver may be provided in the form of a separate annular insert located in the gap between adjacent faces, it may also be in the form of a coating on the appropriate surface of the reactive metal, for example, an electrodeposit.

The bond between the component parts of the bloom may be formed either by a separate heating step before extrusion or during the extrusion process which involves heating the metal to extrusion temperature.

An extrudate formed by the method of this invention can be cold worked into a tubular form by conventional cold working practices such as drawing, tube reducing (cold pilgering) or mandrel rolling.

The aforementioned tubular members which are to be assembled concentrically are in the form of pierced billets and whilst the conductive metal billet may be produced by conventional processes, the reactive metal billet may, with advantage, be pierced by a known method wherein a ductile metal is interposed between the piercing tool and the reactive metal to prevent galling. The sizes of the respective billets are chosen to produce after extrusion and drawing the desired proportions of conductive metal and reactive metal in the wall of the tube.

Conventional forming processes cannot be readily used for the working of reactive metals such as titanium because of the tendency of such metals to gall and cause seizure of the workpiece and tool surfaces. Hence these components for the composite bloom or billet made from reactive metals need to be processed and treated according to the process now to be described in which a coating of copper, nickel or silver is electrodeposited on the reactive metal.

DESCRIPTION OF THE PREFERRED EMBODIMENT

The coating is deposited in conventional manner using a conventional electrolyte, preferably an acid copper sulphate solution in the case of copper, the surface of the reactive metal being acid pickled to remove oxide prior to the deposition process.

A fairly thick coating of the ductile metals copper, nickel or silver on the reactive metal tubular member is desirable for extrusion and drawing, eg 0.100 inch, the thickness depending upon the total amount of reduction from start to finished size, and while this thickness can be applied by a single electrodeposition treatment some difficulties may arise from lamination of the deposit during heat-treatment. This can be avoided by applying a coating which consists of two or more layers of the ductile metal. A thin layer of the ductile metal, eg 0.001–0.005 inch is electrodeposited on the tubular member of reactive metal which is then heat-treated to form the diffusion bond between the reactive metal and the ductile metal, and then a second, considerably thicker layer of ductile metal deposited on the thin layer. Alternatively, instead of electrodepositing a second layer of ductile metal, the reactive metal tubular member can be totally enclosed in a close fitting can made from the ductile metal. The subsequently applied layer need not necessarily be of the same metal as the first layer. In one method of carrying out the invention, a thick layer of ductile metal is deposited onto the clean surface of the reactive metal and a bond is formed between the ductile metal and the reactive metal during actual extrusion.

The success of the process depends upon the formation of a diffusion bond across the interface between the reactive metal and the deposit of ductile metal, for example, in the case of copper coated titanium, a copper-titanium compound is formed across the interface by heating at 800° C. Once this bond is formed, in the one case by prior heat-treatment of the reactive metal tubular member or in the other case during the extrusion process, the coating of ductile metal is sufficiently adherent to the surface of the reactive metal tubular member or extrudate to withstand the extrusion and/or the cold working operations as the case may be. A mere mechanical keying onto an unprepared surface, as in canning, does not provide sufficient adherence.

The present invention offers the advantage that high corrosion resistance is combined with high thermal conductivity. The cheaper, high thermal conductivity material makes up the bulk of the wall of the product to impart rigidity and strength and the material and the high corrosion resistant metal, which is costly, is in the form of a thin protective layer on one or both surfaces of the product. The preferred thickness of the reactive metal is 10% or less of the total wall thickness of the finished tube. Compared with a tube made wholly from the corrosion resistant metal, the composite tube is of low metal value and its effectiveness is equal or even better from the heat exchange aspect. The present invention is particularly valuable for application as a heat exchange tube.

DESCRIPTION OF THE DRAWINGS

The method according to the invention is illustrated, by way of example only, in FIGS. 1, 2 and 3, of which

Figure 1:
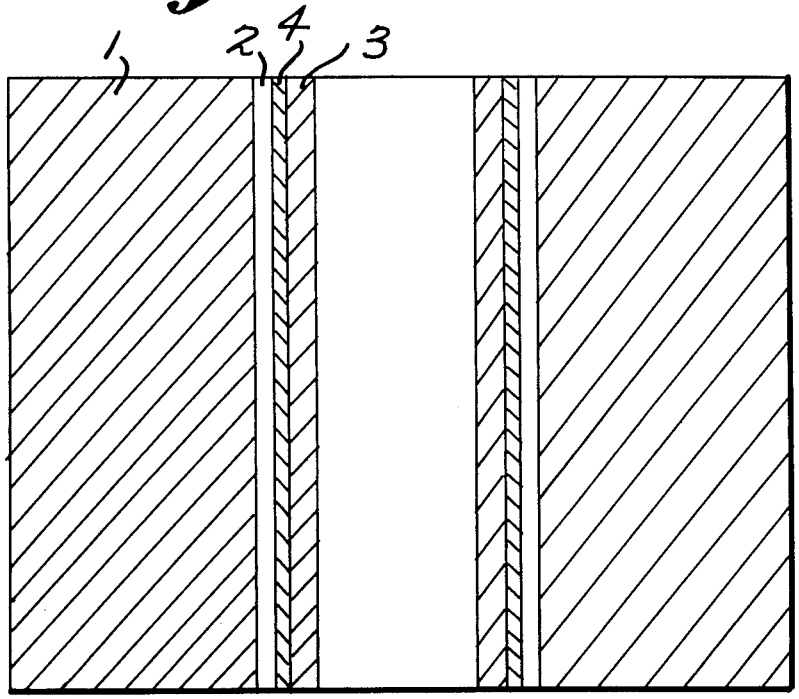
FIG. 1 is a cross-section of the respective billets assembled prior to extrusion.

The assembly of FIG. 1 consists of an annular billet 1 of 2% aluminum-brass of the quality normally used for marine condenser tubes and is of a diameter suitable for location in the container of a conventional extrusion press, the billet 1 having an axial circular aperture 2. Coaxially within the aperture 2 is located an annular titanium billet 3, the wall thickness of which is chosen to provide in the final product 10% or less of the total wall thickness. The titanium billet 3 is coated with a layer of copper 4 in a prior step and is spaced from the aperture 2 by a gap of 0.003–0.010 inch.

Figure 2:
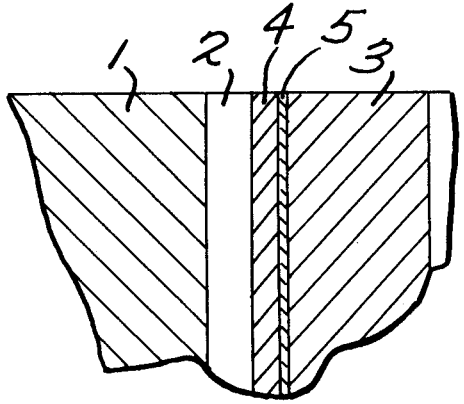
FIG. 2 is an enlargement of a portion of FIG. 1.

Coating of the titanium billet 3 in the said prior step is a two-stage operation, first a thin layer of electrodeposited copper 5 is heat bonded to the titanium and a second thick layer of copper 4 then electrodeposited onto the bonded copper 5. FIG. 2 shows an enlarged view of the layers 4 and 5.

Figure 3:
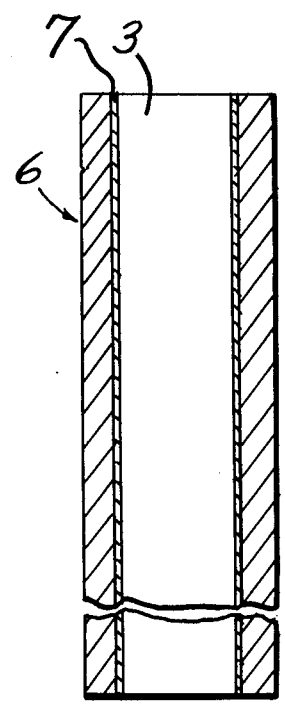
FIG. 3 shows the bimetallic tube produced after the extrusion of the assembly of FIG. 1.

The assembly of FIG. 1 is heated to extrusion temperature and extruded to form the tube 6 of FIG. 3, the surface of the aperture 2 of the brass readily bonding to the surface of the copper layer 4 during extrusion. The tube 6, shown with cut ends, then consists of a wall having 90% of its thickness consisting of aluminum-brass 7 on the outside and 10% of its thickness consisting of titanium on the inside.

We claim:

1. A method of producing a composite tubular product comprising assembling concentrically a first tubular member of a highly corrosion resistant reactive metal which is selected from the group consisting of titanium, tantalum and zirconium and a second tubular member of a highly thermally conductive metal which is selected from the group consisting of copper and copper alloy with a relatively narrow annular gap therebetween, there being a layer of coating of a metal selected from the group consisting of copper and nickel on the surface of the first member facing towards the second member, heating the assembly to an extrusion temperature at which diffusion occurs at the interface between the reactive metal and the layer or coating thereon, and then extruding the assembly at that temperature to bond the layer or coating to the highly thermally conductive metal, a diffusion bond being formed between the reactive metal and said coating.

2. A method of producing a composite tubular product comprising assembling concentrically a first tubular member of a highly corrosion resistant reactive metal which is selected from the group consisting of titanium, tantalum and zirconium and a second tubular member of a highly thermally conductive metal which is selected from the group consisting of copper and copper alloy with a relatively narrow annular gap therebetween, there being a layer of coating of copper on the surface of the first member facing towards the second member, heating the assembly to an extrusion temperature at which diffusion occurs at the interface between the reactive metal and the layer or coating thereon, and the extruding the assembly at that temperature to bond the layer or coating to the highly thermally conductive metal, a diffusion bond being formed between the reactive metal and the copper.

3. A heat exchange tube produced by a method in accordance with claim 2.

4. A method as claimed in claim 2 in which the gap between adjacent surfaces is so dimensioned that the ingress of furance gases is kept to a minimum during preheating prior to extrusion.

5. A method as claimed in claim 2 in which the copper is in the form of an annular insert.

6. A method as claimed in claim 2 in which the copper is in the form of a coating on the surface of the reactive metal.

7. A method as claimed in claim 6 in which a relatively thin coating is formed on the reactive metal and is heated to form a diffusion bond, and then a relatively thick coating is formed over the relatively thin coating.

8. A method as claimed in claim 2 in which the diffusion bond is at least partially formed by an additional heating step before said heating to extrusion temperature.

9. A method as claimed in claim 2 in which the diffusion bond is formed substantially only during said heating and extrusion process.

10. A method as claimed in claim 1, wherein the metal of said first tubular member is selected from the class consisting essentially of titanium, zirconium and tantalum.

11. A method as claimed in claim 2 comprising the additional step of cold working the extruded product.

12. A method of producing a composite tubular product comprising assembling concentrically a first tubular member of a highly corrosion resistant reactive metal which is selected from the group consisting of titanium, tantalum and zirconium and a second tubular member of a highly thermally conductive metal which is selected from the group consisting of copper and a copper alloy with a relatively narrow annular gap therebetween, there being a layer or coating of nickel on the surface of the first member facing towards the second member, heating the assembly to an extrusion temperature at which diffusion occurs at the interface between the reactive metal and the layer or coating thereon, and then extruding the assembly at that temperature to bond the layer or coating to the highly thermally conductive metal, a diffusion bond being formed between the reactive metal and the nickel.

13. A method as claimed in claim 12, wherein the metal of said first tubular member is selected from the class consisting essentially of titanium, zirconium and tantalum.

14. A method as claimed in claim 13, wherein the nickel is in the form of an annular insert.

15. The method as claimed in claim 14, in which the nickel is in the form of a coating on the surface of the reactive metal.

* * * * *